(12) United States Patent
Fonts Zaragoza et al.

(10) Patent No.: US 9,383,737 B2
(45) Date of Patent: Jul. 5, 2016

(54) BUILDING ENERGY MANAGEMENT METHOD AND SYSTEM

(71) Applicant: TRANE U.S. INC., Piscataway, NJ (US)

(72) Inventors: Alberto Fonts Zaragoza, Santa Clara, CA (US); Frank Carl Altamura, Jr., Napa, CA (US); Mohan Ram Dattatreya, Sunnyvale, CA (US); Himanshu Monty Joshi, Palo Alto, CA (US)

(73) Assignee: TRANE U.S. INC., Piscataway, NJ (US)

( * ) Notice: Subject to any disclaimer, the term of this patent is extended or adjusted under 35 U.S.C. 154(b) by 0 days.

(21) Appl. No.: 14/579,666

(22) Filed: Dec. 22, 2014

(65) Prior Publication Data

US 2015/0105929 A1    Apr. 16, 2015

Related U.S. Application Data

(63) Continuation of application No. 12/805,562, filed on Aug. 5, 2010, now Pat. No. 8,918,220.

(51) Int. Cl.
| | |
|---|---|
| *G05F 1/66* | (2006.01) |
| *G05B 15/02* | (2006.01) |
| *H02J 13/00* | (2006.01) |
| *H02J 3/14* | (2006.01) |

(52) U.S. Cl.
CPC ............. *G05B 15/02* (2013.01); *H02J 13/0017* (2013.01); *H02J 2003/146* (2013.01); *Y02B 70/3216* (2013.01); *Y02B 90/2607* (2013.01); *Y04S 20/221* (2013.01); *Y04S 20/224* (2013.01); *Y04S 40/12* (2013.01)

(58) Field of Classification Search
None
See application file for complete search history.

(56) References Cited

U.S. PATENT DOCUMENTS

| | | | |
|---|---|---|---|
| 4,964,065 A * | 10/1990 | Hicks | G01D 7/08 324/639 |
| 6,601,004 B2 | 7/2003 | Ballantyne et al. | |
| 8,918,220 B2 * | 12/2014 | Fonts Zaragoza et al. | 700/291 |
| 2003/0158631 A1 * | 8/2003 | Masuda | H02J 3/00 700/286 |
| 2006/0259621 A1 | 11/2006 | Ranganathan et al. | |
| 2011/0166913 A1 | 7/2011 | Buchanan | |
| 2011/0251966 A1 | 10/2011 | Akers et al. | |

* cited by examiner

*Primary Examiner* — Sean Shechtman
(74) *Attorney, Agent, or Firm* — Hamre, Schumann, Mueller & Larson, P.C.

(57) ABSTRACT

An energy management system within a building obtains energy usage data over several cycles to determine a minimum feasible load. The minimum feasible load corresponds to operational conditions of the building, such as occupied or unoccupied. The energy usage data is binned according to the operational condition under which it was obtained. A threshold based on the minimum feasible load is used to monitor energy usage within the building and to identify anomalies in energy demand for possible action.

17 Claims, 7 Drawing Sheets

| | Occupancy | Hour | Temperature* |
|---|---|---|---|
| Bins | Occupied | 12am - 3:59am | Min T to Min + 20 (F) |
| | Unoccupied | 4am – 7:59am | Min T +20 to + MinT+40 |
| | | 8am – 11:59am | MinT+40 to MinT+60 |
| | | 12pm – 3:59pm | MinT+60 to Min T + 80 |
| | | 4pm – 7:59pm | Min T+80 to MinT+100 |
| | | 8pm – 11:59pm | Min T +100 to Min T+120 |
| | | | Min T +120 to Max T |

Fig 2B

BUILDING ENERGY MANAGEMENT METHOD AND SYSTEM

FIELD OF THE INVENTION

The present invention relates to a system and processes to manage energy use within a building. More particularly, the present invention relates to determining a minimum feasible load for different conditions within the building and using this value to manage energy usage and demand.

DISCUSSION OF THE RELATED ART

Buildings seldom operate at the efficiency levels planned during building commissioning. Many existing or older buildings do not take into account energy efficiency with their design. Building conditions change because building operators or managers modify building operations without considering any impact on energy efficiency or expenditure.

This degradation of energy efficiency may be known as energy efficiency drift. Building managers may undertake efforts to reduce the drift by retrofits or costly maintenance projects. Further, it is difficult to really quantify the energy efficiency drift and its impact on energy costs in a building. Building managers may run simulations to determine the drift or use regression analysis, but these are costly and not done in real-time.

SUMMARY OF THE INVENTION

Embodiments of the present invention disclose a building energy management system. Using gateway devices, meters or other data compiling devices, the disclosed embodiments produce energy usage data relating to building operations. The disclosed embodiments determine a minimum feasible load of the building under a set of operational conditions, such as the building being occupied or unoccupied. The difference between the actual performance and the minimum feasible load is determined and displayed by the system as an opportunity for saving and to give an indication of problems within the building. The building manager or system operator may implement appropriate measures based on the information.

According to the disclosed embodiments, a method for managing energy usage within a building is disclosed. The method includes obtaining at least one energy usage value for an operational condition of the building over a cycle. The method also includes binning the at least one energy usage value according to the operational condition. The method also includes determining a minimum feasible load for the operational condition based on a plurality of binned energy usage values obtained over a plurality of cycles. The method also includes determining whether a data point for energy usage corresponding to the operational condition is above a threshold based on the minimum feasible load. The method also includes taking an action when the data point is above the threshold.

Further according to the present invention, a method for managing energy usage within a building is disclosed. The method includes obtaining energy usage data points over a plurality of cycles for a plurality of operational conditions. The method also includes placing each energy usage data point into a bin within an operational conditions map having the plurality of operational conditions. The method also includes determining a minimum feasible load for each of the plurality of operational conditions based on the energy usage data points stored in bins of the operational conditions map. The method also includes monitoring energy demand within the building according to a threshold based on the minimum feasible load according to each operational condition.

Further according to the present invention, an energy management system for a building is disclosed. The energy management system includes a network of at least one device to obtain energy usage data for the building. The energy usage data is stored in a server. The energy management system also includes an energy system manager coupled to the network to determine a minimum feasible load for an operational condition of the building based on the energy usage data. A problem condition is determined when an energy usage data point obtained over the network exceeds the minimum feasible load.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed by the claims and their equivalents.

FIG. 2B illustrates an operational conditions map according to the disclosed embodiments.

DETAILED DESCRIPTION OF THE PREFERRED EMBODIMENTS

Figure 1:
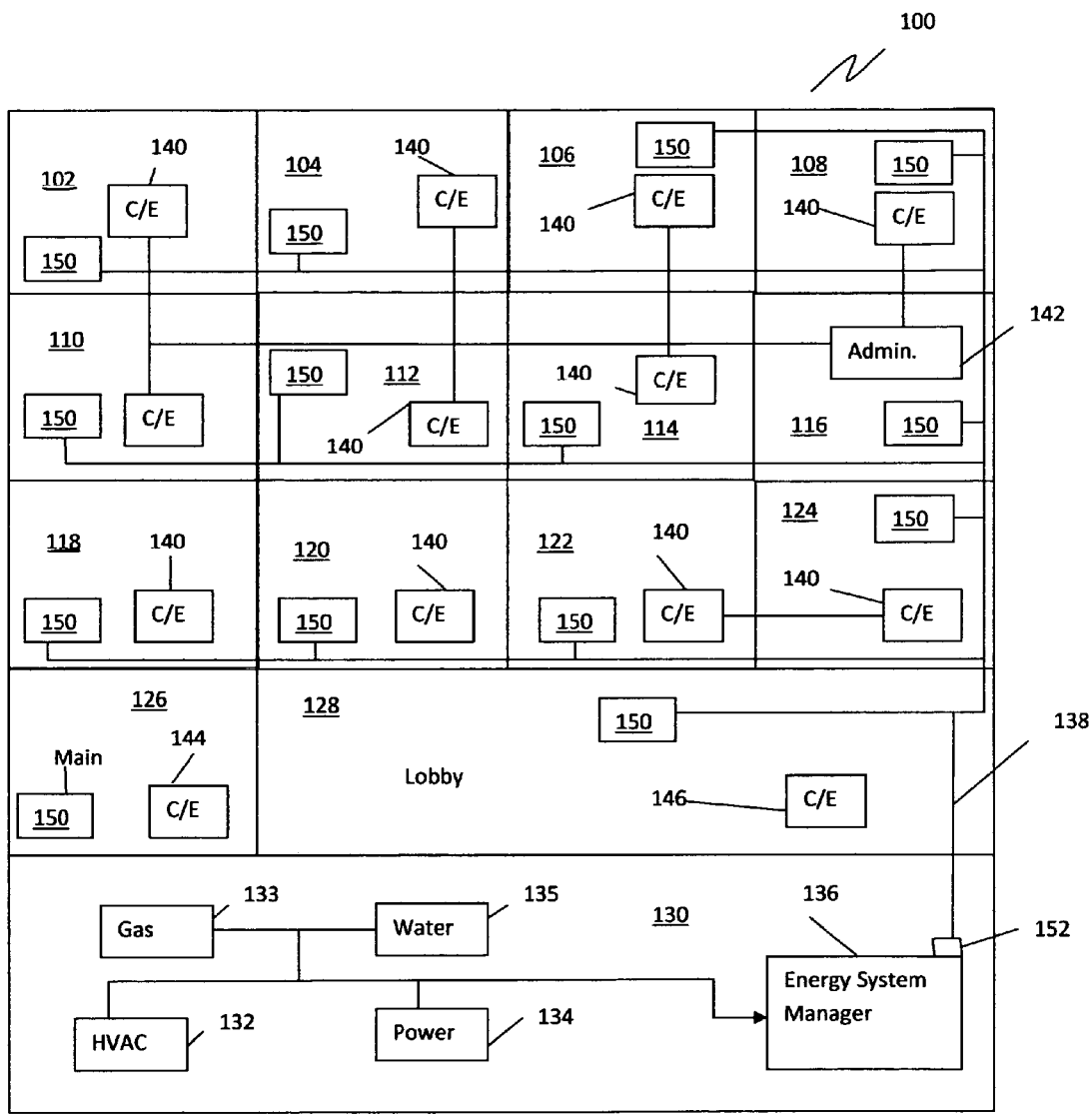
FIG. 1 illustrates a block diagram of a building having a building energy management system according to the disclosed embodiments.

Aspects of the invention are disclosed in the accompanying description. Alternate embodiments of the present invention and their equivalents are devised without parting from the spirit or scope of the present invention. It should be noted that like elements disclosed below are indicated by like reference numbers in the drawings.

FIG. 1 depicts a building 100 having a building energy management system 102 according to the disclosed embodiments. Building 100 may be any type of building having a variety of configurations and layouts. The configuration shown in FIG. 1 is for illustrative purposes only and building 100 may have any number of floors, rooms, spaces, and the like. Alternatively, "building 100" may represent a plurality of buildings or structures. For example, the disclosed embodiments may apply to a campus setting having several buildings that consume energy. The disclosed embodiments may manage energy usage within any setting that allows collection and determination of energy usage for an area, number of units, and the like.

Building 100 includes rooms 102-124, maintenance room 126, lobby 128 and control room 130. These entities also may be known as "units" within building 100. The units may refer to any location or area within building 100 and are not limited to enclosed spaces or offices. Cubicles or storage areas may be units as well. A unit may be designated as an area that has measurable energy usage and may be designated as having a condition, such as occupied or unoccupied. According to the disclosed embodiments, the condition of the unit provides the basis for managing energy use.

Control room 130 may be any room within building 100 that houses those systems that supervise operations and conditions within the entire building, such as heat, ventilation, air conditioning (HVAC) 132 and power 134. HVAC 132 and power 134 supply heat, air and power to the units in building 100. Control room 130 also may house gas 133 and water 135, which supply gas for heating and other functions and water to bathrooms, kitchens, fountains and the like. All these elements require energy drawn from resources outside building 100. Further, one can measure the amount of energy these elements consume over a time period. Control room 130 also includes energy system manager 136 which monitors the energy usage by the units within building 100 and controls energy management system 138.

Rooms 102-124 include computer/electronics 140, which represent all the computers, lights, printers, electronics, phones and the like for that unit. For example, room 102 may have a computer, scanner, printer, telephone and facsimile machine that all use energy supplied by power 134. Thus, computer/electronics 140 may include all devices and items that consume energy with each room. Rooms 102-124 also place heating/cooling demands on HVAC 132, power 134, gas 133, and water 135.

Computer/electronics 140 may be grouped together to form networks within building 100. For example, network 141 may connect all computers/electronics 140 in rooms 102-114. Network 141 may be any type of network, such as a local area network, wireless network, virtual network and the like. Administrator 142 may be the computer and electronics that manage network 141, such as routers, servers and the like. Administrator 142 also may be coupled to energy management system 138 for network 141.

Every unit within building 100 includes devices that consume energy, which may be measurable by energy management system 138. Maintenance room 126 includes computer/electronics 144 that may include devices and machines not found in the other units, and may consume more energy in the form of cooled air than normal rooms. Alternatively, maintenance room 126 may house servers or other electronics for data storage by networks within building 100, which impose their own demands on HVAC 132, power 134, gas 133, and water 135. Lobby 128 includes computer/electronics 146 that differ from computer/electronics 140 as it may include information kiosks, increased lighting, wall directories and other devices that consume energy.

All computers and electronics consume energy that is measurable. Energy management system 138 collects measurements on energy usage and uses these values to identify the minimum feasible load under a certain set of conditions. For example, a condition may be that all of rooms 102-124 are unoccupied. Energy expenditure under these conditions should be minimal. If energy usage exceeds a threshold based on the minimum feasible load for that condition, then energy system manager 136 alerts an operator of the problem in order to take action.

To measure energy use under certain conditions, energy management system 138 uses meters, or gateway devices, 150. Gateway devices 150 connect to computer/electronics 140 as well as lighting, HVAC, gas, and water services to constantly monitor energy usage by these entities within building 100. In FIG. 1, every unit, or room, includes a gateway device 150. Data collected by each gateway device is exported to server 152 of energy management system 138. The data is stored until used by energy management system 138 in the operations disclosed below.

In a sense, gateway devices 150 act as "meters" to provide readings to energy management system 138. Energy system manager 136 then determines the minimum feasible load along with an applicable threshold and then keeps the power consumption of building 100 as close to this value as possible. Gateway devices 150 provide readings under conditions such as occupied or unoccupied over a period.

For example, gateway devices 150 measure energy usage of the units or locations within building 100 for each quarter-hour over a period, such as a day. Energy system manager 136 keeps tabs on the conditions during the day. For example, building 100 may be unoccupied from 12 am to 5 am. Energy management system 138 compiles this data over a cycle. A cycle is amount of time, such as a day, week, month or year in which building 100 goes over a significant amount of operational conditions more than once. Thus, over a cycle, building 100 may be unoccupied several times to provide better data for determining the minimum feasible load.

Alternatively, energy management system 138 may take energy usage data from power 132, HVAC 134, gas 133, and water 135 for the total energy usage within building 100. Such a configuration may eliminate the need for gateway devices 150. No matter what configuration is used, building management system 138 may communicate as a fixed network, wireless or wired network, and the like. In short, building management system 138 obtains energy usage data on building 100.

Figure 2A:
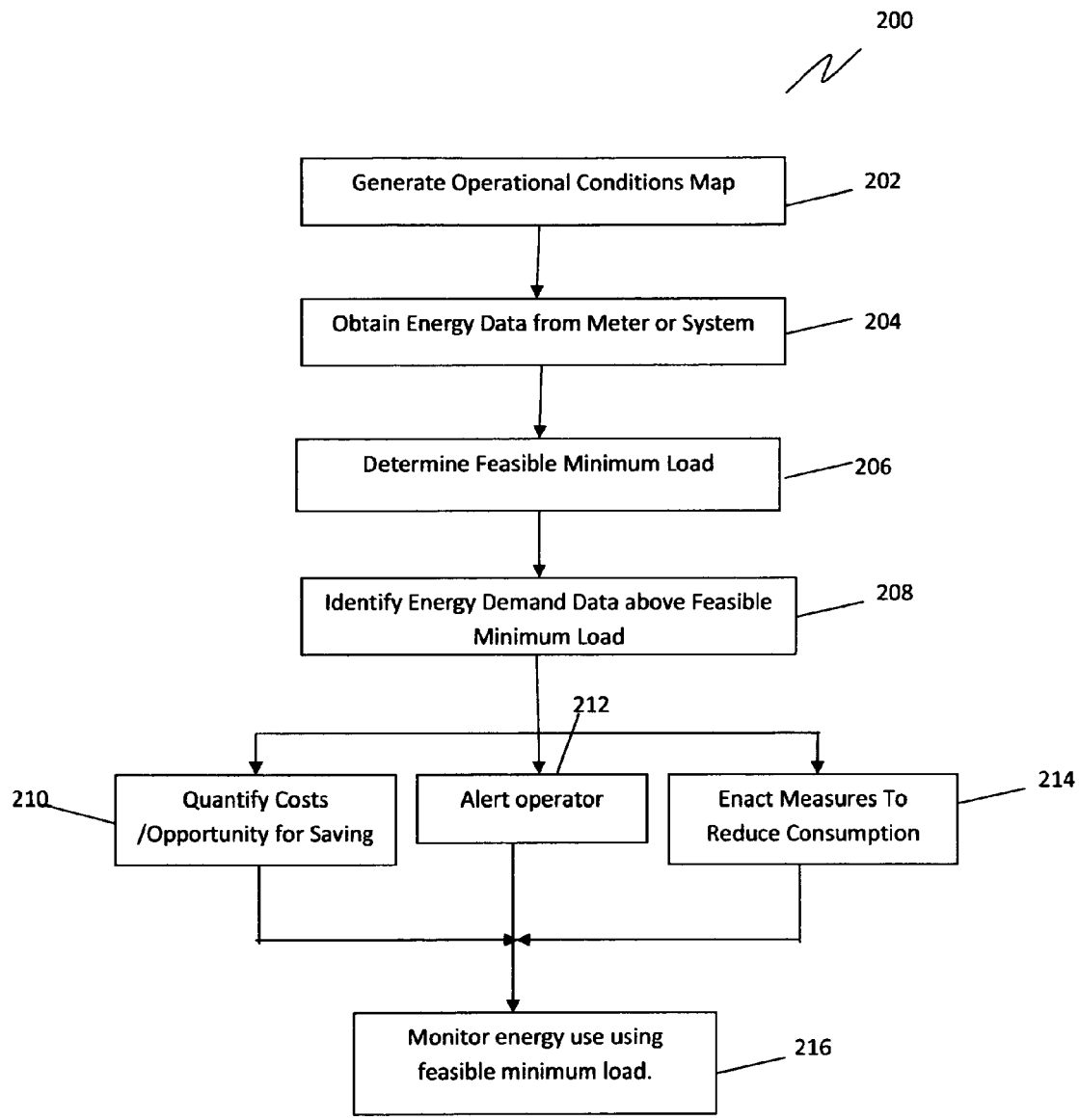
FIG. 2A illustrates a flowchart for managing energy usage within a building according to the disclosed embodiments.

FIG. 2A depicts a flowchart 200 for managing energy usage within building 100 according to the disclosed embodiments. Step 202 executes by generating an operational conditions map. The operational conditions map is based on the operational states of building 100. For example, building 100 may be occupied or unoccupied. If a unit of building 100, such as rooms 102, 106, 112, and 126 are occupied, then building 100 is in an occupied state. If rooms 102-126 and lobby 128 are unoccupied, then building 100 is in an unoccupied state.

Thus, a simple operational conditions map may show just the occupied or unoccupied states of building 100. The disclosed embodiments may utilize more complex maps that include temperature, time of day, outside weather conditions, and the like. An example of an operational conditions map is shown in FIG. 2B, disclosed below. The operational conditions map is used to bin the time series energy usage data from energy management system 138 as reported over a cycle of time.

Step 204 executes by obtaining energy usage data from meters, such as gateway devices 150, through energy management system 138. As disclosed above, gateway devices 150 may measure the amount of energy used for a unit within building 100. Measurements may include power to computer/electronics 140, HVAC, lighting, and the like. In short, the meters may measure power used for any process or operation for a period of time, such as 15 minutes, an hour, and the like. The total energy usage for building 100 may be compiled from this data.

Step 206 executes by determining the minimum feasible load for the operational conditions of building 100. For example, energy management system 138 and energy system manager 136 executes a process to determine the minimum feasible load based on the data stored in server 152. This process is disclosed in greater detail below. In short, the disclosed embodiments account for the minimum values of energy metered for each cycle under each operational condition or set of conditions. These values are saved up to a maximum of N cycles, beyond which the oldest value will be discarded and a new one added. Thus, the disclosed embodiments keep a queue of N values, such as 20, that adjusts the minimum feasible load over time.

Step 208 executes by identifying energy demand data above the minimum feasible load. Step 208 compiles data on energy usage to compare against the minimum feasible load. The disclosed embodiments may monitor energy usage over the periods of time, such as 15 minute intervals or an hour, and respond when energy demands are above the minimum feasible load. Alternatively, the disclosed embodiments may store this information for review by an operator via energy management system 138. By monitoring energy usage, action may be taken under certain circumstances with energy demand exceeds a threshold based on the minimum feasible load.

Steps 210-214 may execute simultaneously after the minimum feasible load is determined and subsequent energy demand data is compiled. Essentially, these steps disclose examples of what energy management system 138 may do using the values for the minimum feasible load. These steps are not exclusive and other actions may be taken in addition to the ones disclosed below.

Step 210 executes by quantifying costs or opportunity for savings using the minimum feasible load. The cost created by excessive energy demand may be the energy efficiency drift. Energy management system 138 may compare compiled data against the minimum feasible load to come up with possible actions to save energy costs by reducing the energy efficiency drift. In other words, lowering the power supplied to various units within building 100 may bring power consumption down to the minimum feasible load and these savings are quantified.

Step 212 executes by alerting the operator, possibly via energy system manager 136, that energy usage for a specified period is above a threshold based on the minimum feasible load. The operator may take steps to lower energy consumption during the next period, like check for lights left on in a room or if HVAC 132 is supplying heated air to an unoccupied area of building 100. The operator also may take a long term fix to reduce energy consumption based on the data received.

Step 214 executes by enacting measures to reduce energy consumption through energy management system 138. Similar to step 212, energy management system 138 and energy system manager 136 may perform actions to reduce energy consumption if data shows usage above the minimum feasible load, or a threshold based on this value. For example, energy management system 138 may instruct HVAC 132 to turn off during unoccupied times during the day if data shows unusual energy usage. Another action may include powering down various computers and electronics within building 100.

Step 216 executes by monitoring energy consumption using the minimum feasible load. The disclosed embodiments may loop back to step 208 such that continuous monitoring of the units of building 100 occurs over energy management system 138.

The disclosed embodiments are not limited to monitoring building 100, but also may determine the minimum feasible load for units or rooms within building 100 such that targeted monitoring of these areas may occur. For example, if energy demand for rooms 102-116 exceeds a threshold based on the minimum feasible load for that area of building 100, then energy management system 138 detects the problem and alerts an operator or makes a record of the anomaly. The network within those rooms may be working overtime or accidentally left on during late hours and this problem may be addressed by monitoring the energy usage according to the disclosed embodiments.

FIG. 2B depicts an operational conditions map 250 according to the disclosed embodiments. Operational conditions map 250 includes bins 252 that represent the different conditions of interest within building 100. Operational conditions map 250 may be broken into three columns, wherein each column is a variable with multiple "states." A combination of all the states within the column is a bin 252.

Column 254 represents the states for occupancy. The states for occupancy may be "occupied" and "unoccupied." Column 256 represents the states for times of day in 4 hour increments for a 24 hour cycle. Column 256 includes 6 states for the hour or time variable. Column 258 represents temperature outside building 100. Outside temperatures have an impact on energy usage within building 100. Extreme cold or heat conditions will increase energy usage within building 100. Column 258 includes 7 states for temperature increments for a range from a minimum temperature (Min T) to a maximum temperature (Max T). According to FIG. 2B, the range is about 140 degrees Fahrenheit. The increments are by 20 degrees.

An energy usage value, or data point, is obtained from readings collected by gateway devices 150 within energy management system 138. The total energy usage demand for building 100 is determined and then placed in the appropriate bin within operational conditions map 250. For example, state 260, or "occupied," state 262, or "between 8 am to 11:59 am," and state 264, or "minimum temperature plus 60 to minimum temperature plus 80," is a bin for a data point meeting all three conditions. If building 100 is occupied between those hours and the outside temperature falls within that range, then the data point is placed in that bin 252.

As numerous data points are compiled for each bin, a better idea of the minimum feasible load is seen. The minimum feasible load for building 100 that is unoccupied, between the hours of 12 am to 3:59 am, and with an outside temperature of minimum temperature plus 60 to plus 80 will be different than the minimum feasible load for a time building 100 occupied in the middle of the day with an outside temperature of minimum plus 100. The disclosed embodiments, therefore, recommend collecting data over several cycles to adequately fill all the bins in operational conditions map 250.

Figure 3:
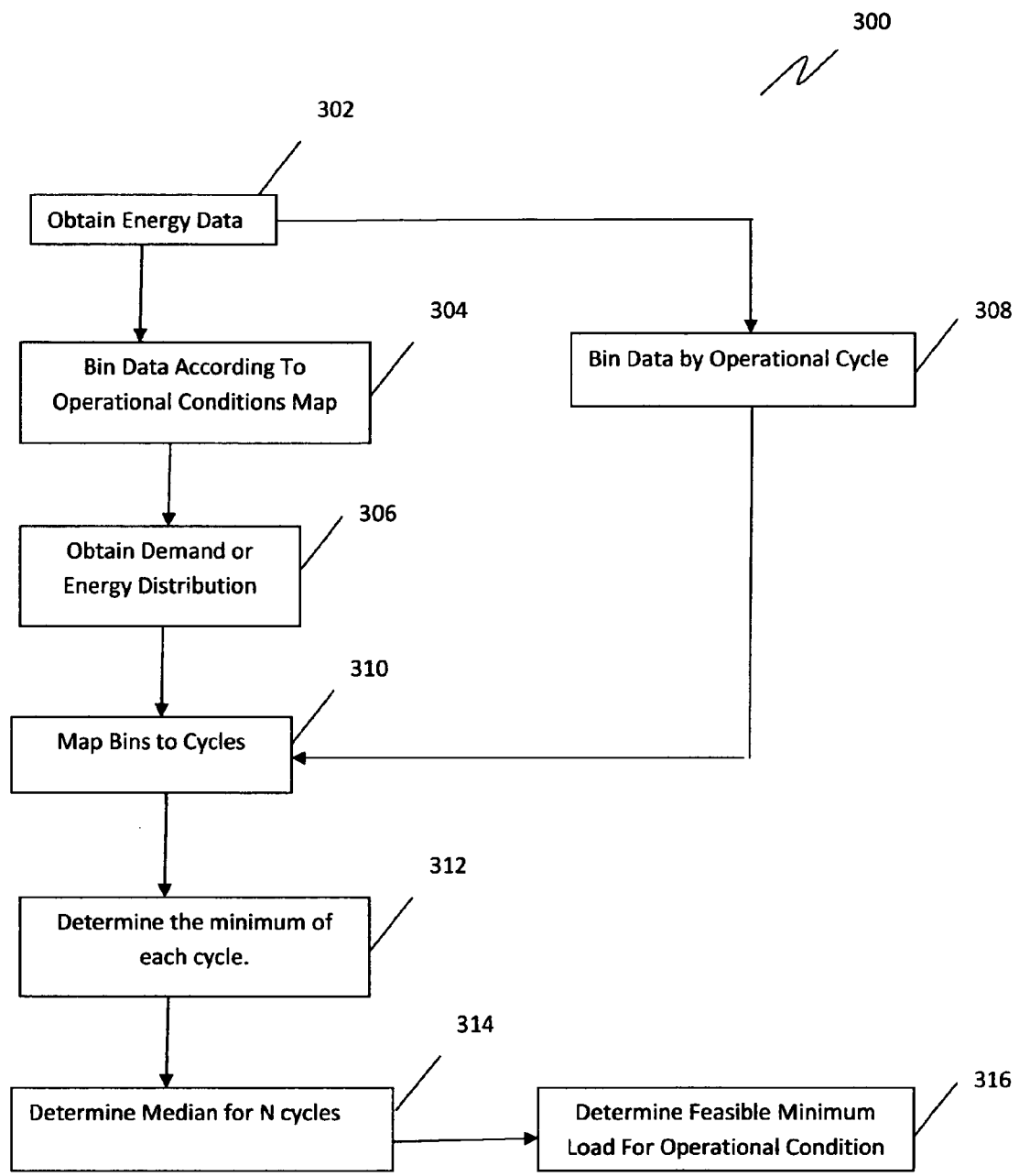
FIG. 3 illustrates a flowchart for determining the minimum feasible load for an operational condition according to the disclosed embodiments.

FIG. 3 depicts a flowchart 300 for determining the minimum feasible load for an operational condition according to the disclosed embodiments. Flowchart 300 may be used for step 206 in FIG. 2. Step 302 executes by obtaining energy usage data. Energy usage data may be collected from sensors, such as gateway devices 150, at scheduled times. Alternatively, energy management system 138 may obtain energy usage data from HVAC 132 and power 134, which provides the overall energy usage data for building 100. As disclosed above, these times may be every 15 minutes, every hour and the like. Preferably, energy management system 138 obtains energy usage data for all of building 100.

Step 304 executes by "binning" the energy usage data according to the operational conditions map. The disclosed embodiments "bin" data by placing the overall energy usage data for building 100 for the time taken into a bin or place on the map that fits the condition under which the data was obtained. An example of the bins for an operational conditions map is disclosed in FIG. 2B. For example, if building 100 is unoccupied when the energy usage data is obtained, then the data is placed in the bin for the unoccupied condition. Using another example, operational conditions map 250 includes outside weather, such as above 60 degrees Fahrenheit, so that the obtained data is binned into the conditions on the map that reflect an unoccupied state when outside temperature is above 60 degrees during a certain time of day.

Step 306 executes by obtaining the demand or energy distribution for energy usage over a cycle. In other words, energy usage data would be collected for a cycle, such as a day, week, and the like. Step 308 executes by binning data by operational cycle. As steps 304 and 306 execute, step 308 provides for operational cycles in which the energy usage data is binned. Thus, for example, if a cycle is a day (or 24 hour period), then the energy usage data is binned to each day of the week. Thus, referring back to operational conditions map 250, another set of states for the map would be "day of the week" within their own column.

Step 310 executes by mapping the bins of data to the operational cycles. Energy management system 138 should obtain multiple samples per cycle to map. After a plurality of cycles, energy management system 138 has enough data to make a meaningful determination for the minimum feasible load. For example, the number of cycles may be 20, such as 20 days. The energy usage data is mapped over each cycle on the operational conditions map taking into account the different conditions for the binned values. Preferably, a large amount of energy usage values should be within each bin of operational conditions map 250.

Step 312 executes by determining the minimum energy usage value for the operational conditions for each cycle. Using the above example, energy management system 138 determines the minimum energy usage demand for each day for the unoccupied bins in the operational conditions map. Thus, there should be 20 of these minimum values when building 100 is unoccupied.

Step 314 executes by determining the median value of the N minimum values for the N cycles. In other words, energy management system 138 determines the median value of the minimum values for the 20 cycles. Step 316 executes by determining the minimum feasible load for an operational condition based on the median value. Using the above example, energy management system 138 sets the median value of the minimum values as the minimum feasible load under the operational condition of building 100 being unoccupied.

The minimum feasible load is not static, but, instead, may be a dynamic value that changes as building 100 changes. The disclosed embodiments update the minimum feasible load after each cycle to take into account various factors that change over a period of time, such as seasonal conditions and energy demand as more devices, computers, electronics, and the like are placed in building 100. In addition, these changing values may be used to determine a threshold to use in monitoring energy usage within building 100 to identify anomalies or problems that arise.

Figure 4:
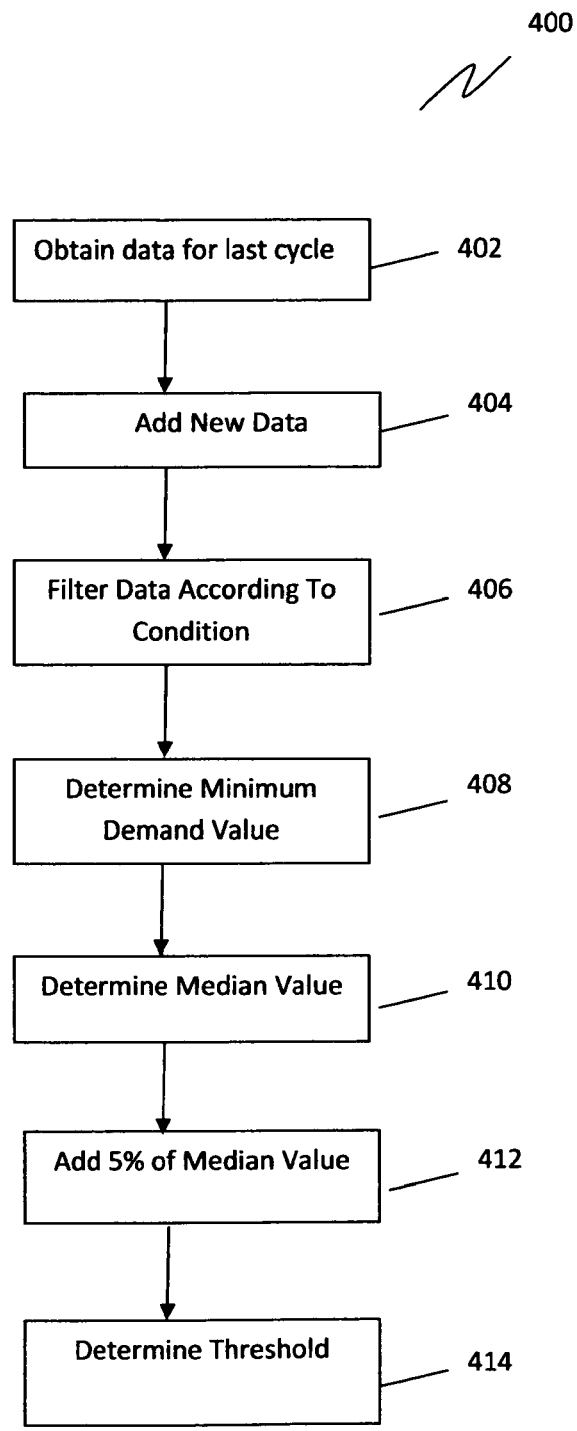
FIG. 4 illustrates a flowchart for updating the minimum feasible load and for determining a threshold according to the disclosed embodiments.

FIG. 4 depicts a flowchart 400 for updating the minimum feasible load value and for determining a threshold according to the disclosed embodiments. This process may be executed at a certain each cycle. For example, if a cycle is a 24 hour period, then the process disclosed by FIG. 4 may execute at 12 am local time. Step 402 executes by obtaining energy usage data for N−1 cycles as placed in the operational conditions bins. Using the above example, energy management system 138 retrieves the energy usage data for the last 19 days.

Step 404 executes by adding new data obtained from the most recent cycle, such as the last 24 hours. Energy management system 138 collects data for the last cycle and bins this new data as it did above. The new data is added to the data for the other 19 cycles stored in server 152.

Step 406 executes by filtering the new energy usage data according to the operational condition. Data not meeting the desired operational condition may be discarded. In other words, if energy management system 138 is concerned with the energy use with building 100 is unoccupied, then it filters out the data when building 100 is occupied. Data collected in the occupied condition are not used.

Step 408 executes by determining the minimum energy demand value for each of the N cycles. Energy management system 138 determines the minimum energy value for the unoccupied condition of building 100 for the last 20 days, which includes the new data for the most recent day that just passed.

Step 410 executes by determining the median value of the minimum values for each cycle. This median value may be known as the new minimum feasible load. Thus, the disclosed embodiments update the minimum feasible load value as more data becomes available through energy management system 138. The minimum feasible load is dynamic as it cycles out old energy usage values and adds the new values for every cycle.

Step 412 executes by adding 5% of the median value to the updated minimum feasible load value to generate a threshold value. This percentage may be any value desired by the operator of energy management system 138, such as 3%, 10%, and the like. This threshold value is the "threshold" disclosed above. Step 414 executes by determining a threshold for energy management system 138 using the threshold value determined in step 412. This threshold may be used by energy management system 138 for the next cycle period in monitoring energy usage and demand for building 100.

Thus, referring back to steps 208 and 216 of FIG. 2, the threshold determined above provides a baseline in which to determine whether energy use within building 100 is normal or under stress. The threshold is based on the minimum feasible load, which is dynamic as new cycles bring in new data. The threshold provides a buffer for slight variations in readings of energy usage so that values close to the minimum feasible load do not unnecessarily spawn alerts within energy management system 138.

Figure 5:
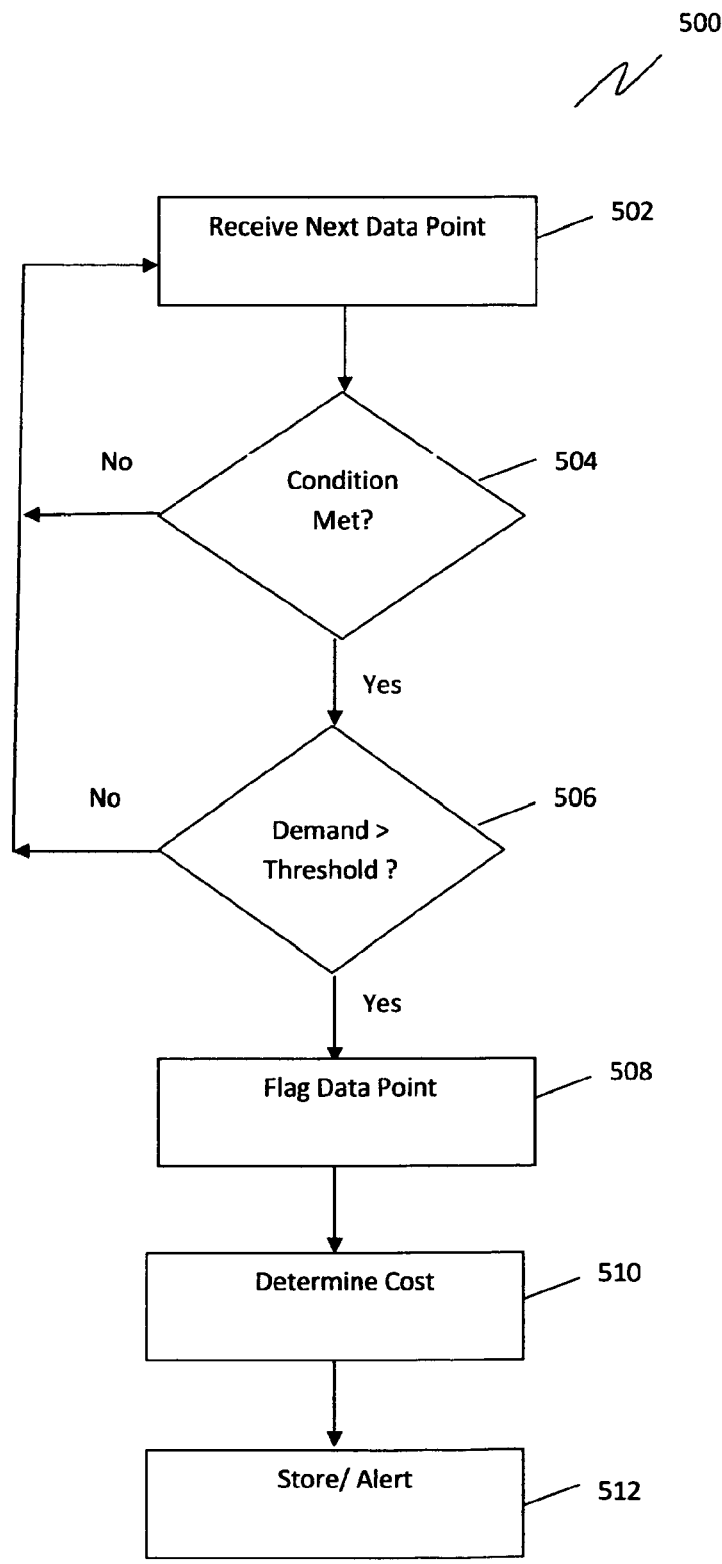
FIG. 5 illustrates a flowchart for monitoring energy usage within a building according to the disclosed embodiments.

FIG. 5 depicts a flowchart 500 for monitoring energy usage within building 100 according to the disclosed embodiments. Flowchart 500 relates to step 208 or step 216 shown in FIG. 2. Every time a data point is received, energy management system 138 may execute this process to determine whether a problem exists within building 100.

Step 502 executes by receiving the next data point from meters, such as gateway devices 150 or other such devices, or from data stored in server 152. This data point may be the energy usage within building 100 at a point in time. Thus, for example, the total energy usage within building 100 is determined and provided as the data point to energy management system 138.

Step 504 executes by determining whether the data point meets the condition specified for monitoring energy usage. Using the examples given above, energy management system 138 applies the minimum feasible load analysis when building 100 is unoccupied. Thus, step 504 determines whether this condition is met, or that building 100 is unoccupied. If no, then flowchart 500 returns to step 502 to await the next data point.

If step 504 is yes, then step 506 executes by determining whether the energy usage, or demand, exceeds the threshold determined in FIG. 4. As disclosed above, the threshold is related to the minimum feasible load. If step 504 is no, then flowchart 500 returns to step 502 to await the next data point. Building 100 is unoccupied, but energy demand for that period, such as 15 minutes, does not exceed the threshold for anomalous energy use for that condition.

If step 506 is yes, then step 508 executes by flagging the data point that exceeds the threshold for the operational condition. Step 510 executes by determining the costs associated with meeting the energy demand about the threshold, and, therefore, above the minimum feasible load as set by the data values over the last 20 days. The process for determining the costs is disclosed in greater detail below.

Step 512 executes by storing the data point as an anomaly or by alerting an operator. For example, the data point may be stored as an unoccupied usage anomaly. Energy management system 138 may use the flagged data point for preventive measures or may store for later retrieval. The data point may be stored within server 152.

Figure 6:
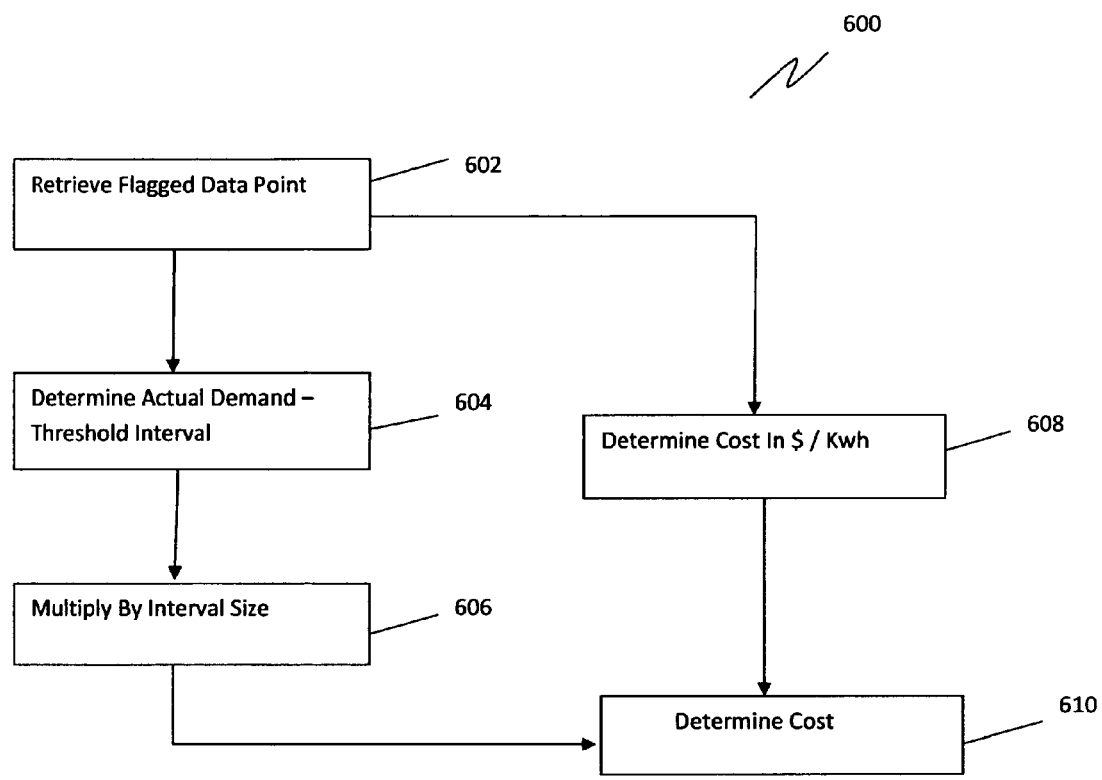
FIG. 6 illustrates a flowchart for determining the costs of an energy usage anomaly within a building according to the disclosed embodiments.

FIG. 6 depicts a flowchart 600 for determining the costs of an energy usage anomaly within building 100 according to the disclosed embodiments. FIG. 6 correlates to step 510 in FIG. 5. Step 602 executes by retrieving the flagged data point obtained by energy management system 138. Step 604 executes by determining the actual energy usage demand to threshold interval. In other words, step 604 determines the difference between the energy usage noted by the data point and the threshold determined as disclosed above. This difference may represent the loss created by the energy usage above the minimum feasible load as it relates to the threshold.

Step 606 executes by multiplying the interval size by the difference determined in step 604. For example, the interval size may be represented in minutes or hours. A 15 minutes interval also is 0.25 hours. Preferably, the value for interval size is represented as an hour or fraction thereof. Step 608 executes by determining the cost for supplying power and energy in dollars per kilowatt hour. This cost relates to the cost to operate building 100 under certain conditions.

Step 610 executes by determining the cost to building 100 for energy usage above the threshold by multiplying the cost in dollars per kilowatt hour by the interval size as represented by hours. This value represents the total cost to operate building 100 without taking any measures, without any action, and how much the building is losing under the operation conditions. The loss value should be in dollars.

Therefore, the disclosed embodiments determine the loss in dollars for the anomalies that rise up in building 100. The losses may be saved for later review or retrieval and used to quantify the energy efficiency drift for building 100. Further, an operator using energy system manager 136, for example, may see the value of preventative action from a cost perspective. Flowchart 600 may then return back to flowchart 500.

Thus, an energy management system and method are disclosed that identifies a minimum feasible load according to various operational conditions based on energy usage. The minimum feasible load changes over time and is used to establish a threshold for efficient energy use within a building. Energy usage data may be collected from any part of the building and used to monitor/manage that part as well.

Another example of the disclosed embodiments includes utilizing an operational conditions map that includes hour of day, temperature and occupancy. The cycle size in this case is wider in scope than a day to ensure that more than one value is obtained for each operational condition. Thus, a reasonable cycle size may be one week. The energy management system would obtain energy usage data and bin this data over N weeks, select the minimum value of each of the bins and determine the minimum feasible load based on these values. Any energy consumption about the threshold based on the minimum feasible load would be considered problematic.

It will be apparent to those skilled in the art that various modifications and variations can be made in the disclosed embodiments of the privacy card cover without departing from the spirit or scope of the invention. Thus, it is intended that the present invention covers the modifications and variations of the embodiments disclosed above provided that the modifications and variations come within the scope of any claims and their equivalents.

What is claimed is:

1. A computer-implemented method for managing energy usage of a building, the method comprising:
    obtaining at least one energy usage value from a metering device, the at least one energy usage value based on an amount of energy used by one or more devices of the building corresponding to an operational condition of the building over a cycle, wherein the operational condition is based on an occupancy schedule of the building;
    binning, by an energy system manager, the at least one energy usage value according to the operational condition;
    determining, by the energy system manager, a minimum feasible load for the operational condition based on a plurality of binned energy usage values obtained over a plurality of cycles from the metering device, the minimum feasible load representing a minimum energy usage to power the one or more devices of the building corresponding to the operational condition;
    determining, by the energy system manager, whether a data point for energy usage corresponding to the operational condition is above a threshold based on the minimum feasible load; and
    generating and sending an alert, by the energy system manager, when the data point is above the threshold.

2. The computer-implemented method according to claim 1, further comprising:
    generating an operational condition map having a plurality of operational conditions, including the operational condition.

3. The computer-implemented method according to claim 1, further comprising storing a record of the alert in a memory.

4. The computer-implemented method according to claim 1, further comprising:
    monitoring energy usage within the building on a periodic basis.

5. The computer-implemented method according to claim 1, wherein determining the minimum feasible load includes:
    taking a median value of a plurality of minimum energy usage values for the operational condition.

6. The computer-implemented method according to claim 1, further comprising:
    updating the minimum feasible load after every cycle.

7. The computer-implemented method according to claim 1, further comprising:
    storing the data point in a memory of the energy system manager.

8. A computer-implemented method for managing energy usage of a building, the method comprising:
    obtaining energy usage values from a plurality of metering devices, the energy usage values based on an amount of energy used by one or more devices of the building corresponding to a plurality of operational conditions of the building over a plurality of cycles, wherein a first of the plurality of operational conditions is based on an occupancy schedule of the building;
    placing, by an energy system manager, the energy usage values into a bin within an operational conditions map having the plurality of operational conditions;
    determining, by the energy system manager, a minimum feasible load for the plurality of operational conditions based on the energy usage values stored in bins of the operational conditions map, wherein the minimum feasible load for the plurality of operational conditions represents a minimum energy usage to power the one or more devices of the building;

determining, by the energy system manager, whether a data point for energy usage corresponding to the operational conditions is above a threshold based on the minimum feasible load; and generating and sending an alert, by the energy system manager, when the data point is above the threshold.

9. The computer-implemented method according to claim 8, further comprising:

obtaining at least one energy usage value corresponding to the operational condition over a second cycle;

placing, by the energy system manager, the at least one energy usage value into a bin according to the operational condition and the second cycle; and determining a second minimum feasible load for the second cycle and the operational condition.

10. The computer-implemented method according to claim 9, further comprising:

determining a median of the minimum feasible loads for the operational condition.

11. The computer-implemented method according to claim 8, further comprising storing a record of the alert in a memory.

12. An energy management system for a building, comprising:

a network of at least one metering device to obtain energy usage data, the energy usage data based on an amount of energy used by one or more devices of the building corresponding to an operational condition of the building over a cycle, wherein the operational condition is based on an occupancy schedule of the building, wherein the energy usage data is stored in a server; and an energy system manager coupled to the network to:

determine a minimum feasible load for the operational condition of the building based on the energy usage data, wherein the minimum feasible load represents a minimum energy usage to power the one or more devices of the building, wherein a problem condition is determined when an energy usage data point obtained over the network exceeds the minimum feasible load, and generate and send an alert, by the energy system manager, when the data point is above a threshold that is based on the minimum feasible load.

13. The energy management system according to claim 12, wherein the energy system manager updates the minimum feasible load for the operational condition of the building as additional energy usage data is received.

14. The energy management system according to claim 12, wherein the at least one device obtains energy usage data for a unit within the building, such that each unit within the building produces energy usage data.

15. The energy management system according to claim 12, wherein the energy usage data corresponds to energy use by a computer or electronics within the building.

16. The energy management system according to claim 12, wherein the at least one device obtains energy usage data on a heating, ventilation, and air conditioning (HVAC) system within the building.

17. The energy management system according to claim 12, wherein the energy system manager stores a record of the alert in the server.

* * * * *